US010189321B2

(12) United States Patent
Bafana et al.

(10) Patent No.: US 10,189,321 B2
(45) Date of Patent: Jan. 29, 2019

(54) AIR MAINTENANCE TIRE SYSTEM COMPONENT PROTECTOR

(71) Applicant: The Goodyear Tire & Rubber Company, Akron, OH (US)

(72) Inventors: Sagar Dilip Bafana, Akron, OH (US); Robin Lamgaday, Wadsworth, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/835,533

(22) Filed: Dec. 8, 2017

(65) Prior Publication Data

US 2018/0099535 A1  Apr. 12, 2018

Related U.S. Application Data (63) Continuation-in-part of application No. 15/186,841, filed on Jun. 20, 2016, now abandoned.

(51) Int. Cl.
*B60C 23/12* (2006.01)
*B60C 29/00* (2006.01)
*B60C 29/06* (2006.01)

(52) U.S. Cl.
CPC ............ *B60C 23/12* (2013.01); *B60C 29/005* (2013.01); *B60C 29/06* (2013.01); *Y10T 137/7043* (2015.04); *Y10T 137/7062* (2015.04)

(58) Field of Classification Search
CPC ..... B60C 29/06; B60C 29/005; B60C 23/004; B60C 29/00; B60C 29/002; B60C 29/003; B60C 29/006; B60C 29/007; B60C 29/02; B60C 29/04; B60C 23/12; Y10T 137/3584; Y10T 137/36; Y10T 137/3615; Y10T 137/3646; Y10T 137/3677; Y10T 137/3693; Y10T 137/3709; Y10T 137/3724; Y10T 137/374; Y10T 137/3755; Y10T 137/3771; Y10T 137/3786; Y10T 137/7043; Y10T 137/7062; Y10S 152/13
USPC ............ 137/223, 377, 378, 381, 382, 382.5; 152/415, 427, DIG. 13, 419, 426, 429; 301/5.24, 37.23, 37.24
See application file for complete search history.

(56) References Cited

U.S. PATENT DOCUMENTS

| | | |
|---|---|---|
| 1,428,241 A | 9/1922 | Kercher |
| 1,507,647 A | 9/1924 | Williams |
| 1,624,974 A | 4/1927 | Putnam |
| 2,505,780 A | 5/1950 | George |
| 2,580,343 A | 12/1951 | Benoit |

(Continued)

FOREIGN PATENT DOCUMENTS

EP  2985159 A1  2/2016

*Primary Examiner* — Craig J Price
(74) *Attorney, Agent, or Firm* — Edward T. Kennedy (57) ABSTRACT

An air maintenance tire system component protector is provided. An air maintenance tire system includes at least one connecting tube extending between and being in fluid communication with an annular air tube and a valve housing. The protector includes a first end disposed proximate the connection of the at least one connecting tube to the annular tube, and a second end disposed proximate the valve housing. A mid-portion of the protector is disposed between the first and second ends. The protector covers an outboard surface of the at least one connecting tube and the valve housing, and includes means for engaging the at least one connecting tube to secure the position of the tube.

20 Claims, 6 Drawing Sheets

(56) References Cited

U.S. PATENT DOCUMENTS

| | | |
|---|---|---|
| 2,631,065 A | 3/1953 | Borodie |
| 3,077,220 A | 2/1963 | Fusco, Jr. |
| 4,235,271 A | 11/1980 | Olsen et al. |
| 4,307,748 A | 12/1981 | Mathias |
| 4,319,618 A | 3/1982 | Suzuki |
| 4,356,836 A | 11/1982 | Wenger et al. |
| 4,563,042 A | 1/1986 | Seitz et al. |
| 4,790,362 A | 12/1988 | Price |
| 7,093,632 B1 | 8/2006 | Falkenborg |
| 8,042,586 B2 | 10/2011 | Losey et al. |
| 8,113,254 B2 | 2/2012 | Benedict |
| 8,479,790 B2 | 7/2013 | Resare et al. |
| 8,876,222 B2 | 11/2014 | Seradarian et al. |
| 9,126,462 B2 | 9/2015 | Hinque |
| 9,381,780 B2 | 7/2016 | Hinque |
| 9,539,869 B2 | 1/2017 | Hinque et al. |
| 2014/0130357 A1 | 5/2014 | Hinque et al. |
| 2014/0150945 A1 | 6/2014 | Kumar et al. |
| 2015/0122390 A1 | 5/2015 | Durr |
| 2017/0217260 A1 | 8/2017 | Lin et al. |

AIR MAINTENANCE TIRE SYSTEM COMPONENT PROTECTOR

CROSS-REFERENCE TO RELATED APPLICATIONS

This Application is a Continuation-in-Part of application Ser. No. 15/186,841, which was filed on Jun. 20, 2016.

FIELD OF THE INVENTION

The invention relates to air maintenance tire systems, which are systems that maintain appropriate air pressure within a pneumatic tire. More specifically, the invention relates to a protector for components of a valve stem-based air maintenance tire system.

BACKGROUND OF THE INVENTION

Conventional pneumatic tires are designed to perform for relatively long periods of time. In many cases, automobile tires are now expected to have a useful service life of 30,000, 50,000, or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. An example of one such system is a valve stem-based air maintenance tire system described in U.S. patent application Ser. No. 15/065,134, which is owned by the same Assignee as the present invention, that is, The Goodyear Tire & Rubber Company.

In such air maintenance tire systems, and particularly valve stem-based air maintenance tire systems, certain components of the systems may be exposed to road debris and environmental conditions. For example, a valve stem-based air maintenance tire system may employ air tubes that extend between a valve housing and a peristaltic pump tube. Such air tubes may be disposed on the outboard surface of the wheel rim and/or tire, where they are exposed to road debris and environmental conditions.

It is therefore desirable to provide a protector that shields and protects such components of a valve stem-based air maintenance tire system from potential damage.

SUMMARY OF THE INVENTION

According to an aspect of an exemplary embodiment of the invention, an air maintenance tire system includes at least one connecting tube extending between and being in fluid communication with an annular air tube and a valve housing. The protector includes a first end disposed proximate the connection of the at least one connecting tube to the annular tube, and a second end disposed proximate the valve housing. A mid-portion of the protector is disposed between the first and second ends, in which the protector covers an outboard surface of the at least one connecting tube.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

It is to be understood that the term inboard is referred to herein as a direction corresponding to the axially inner surface or side of a tire, and the term outboard is referred to herein as a direction corresponding to the axially outer surface or side of a tire. The term axially inwardly refers to an axial direction that is toward the center plane of a tire, and the term axially outwardly refers to an axial direction that is away from the center plane of a tire. The term radially inwardly refers to a radial direction that is toward the central axis of rotation of a tire, and the term radially outwardly refers to a radial direction that is away from the central axis of rotation of a tire.

Figure 1:
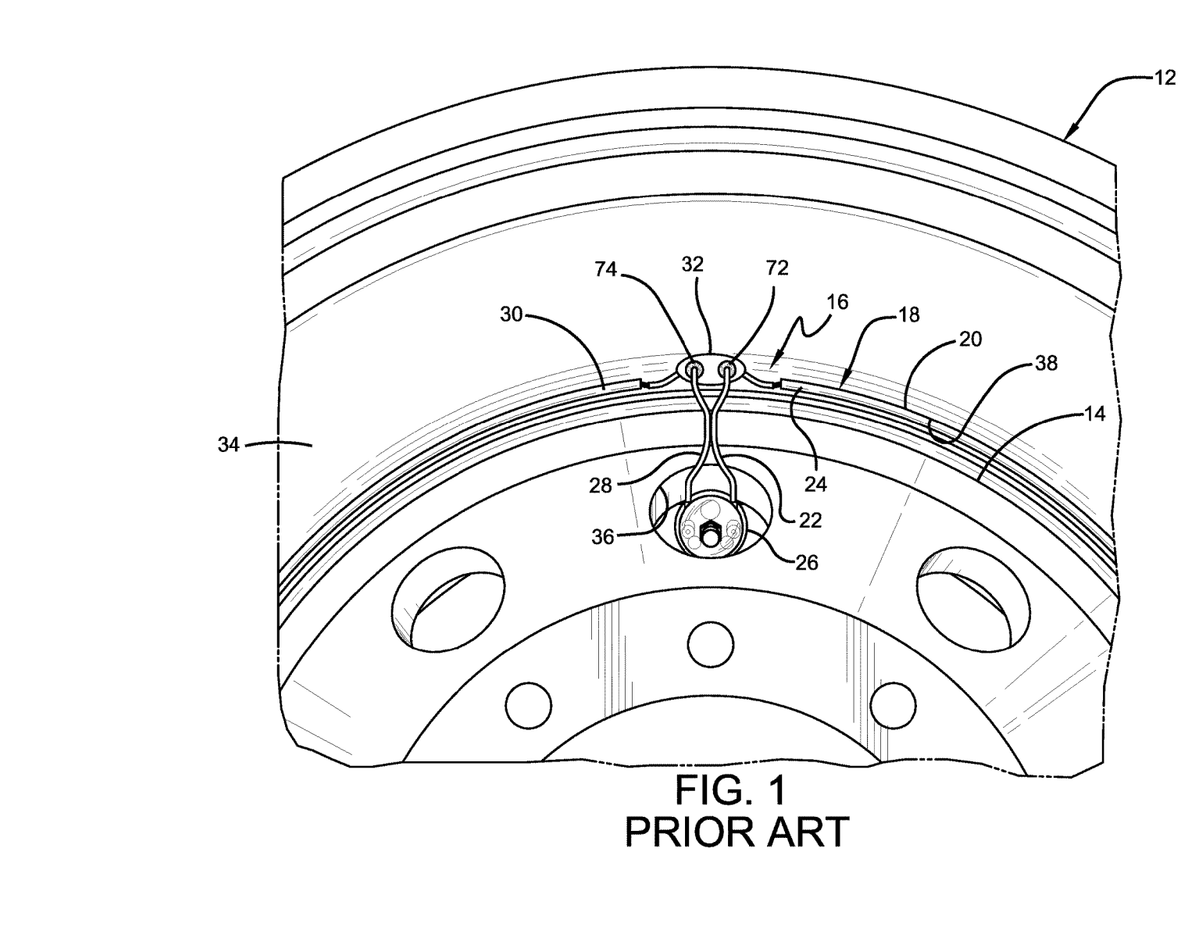
FIG. 1 is a fragmentary elevational view of an outboard side of a tire including components of a valve stem-based air maintenance tire system.
Figure 2:
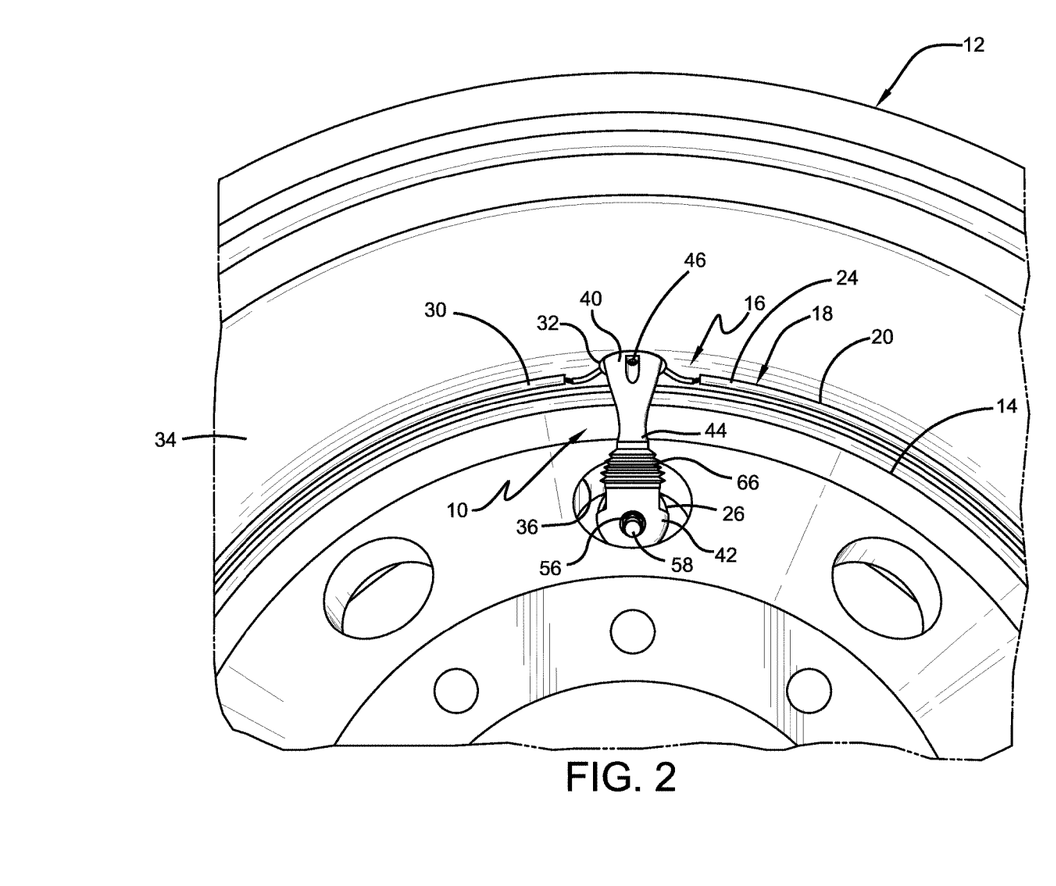
FIG. 2 is a fragmentary elevational view of an outboard side of a tire including components of a valve stem-based air maintenance tire system and an exemplary embodiment of an air maintenance tire system component protector of the present invention.
Figure 3:
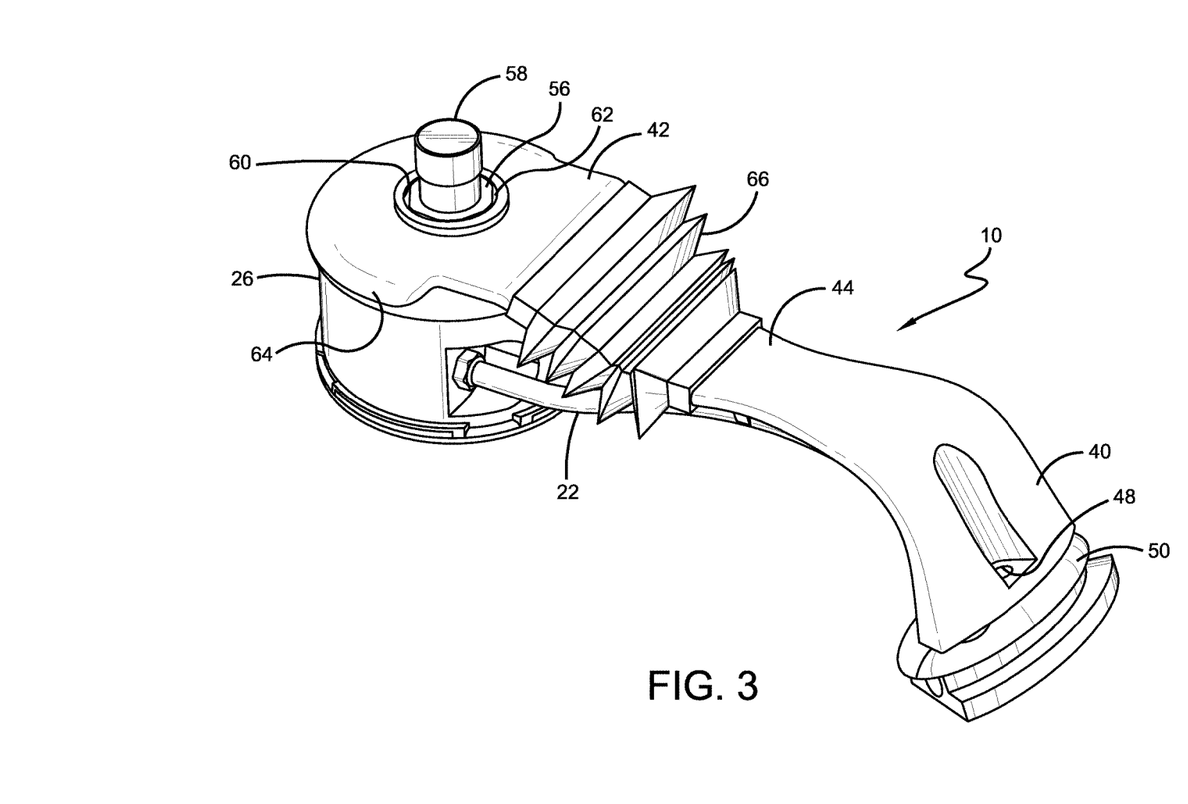
FIG. 3 is a perspective view of the air maintenance tire system component protector shown in FIG. 2.
Figure 4:
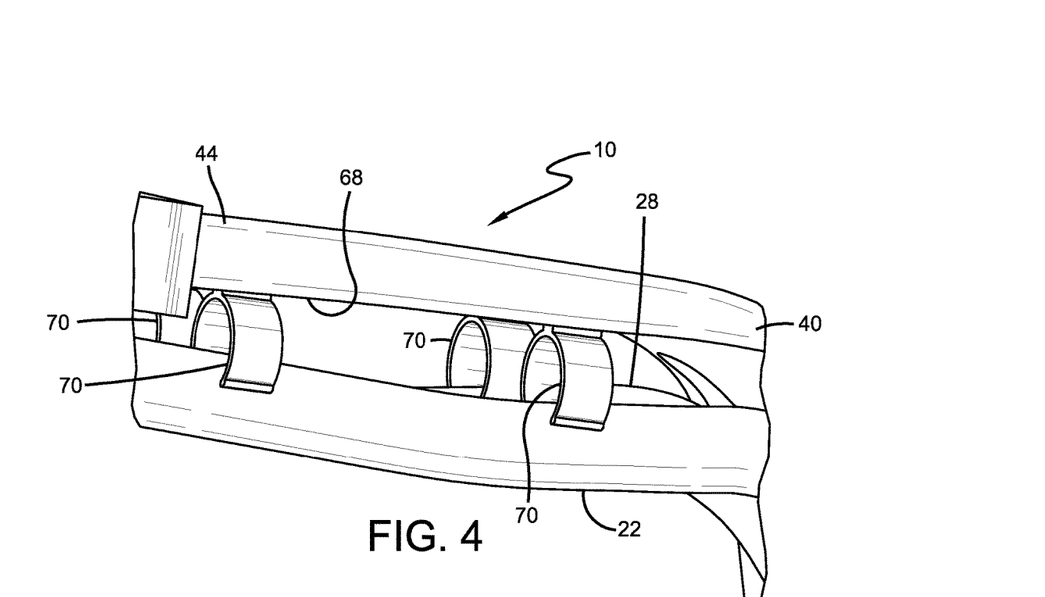
FIG. 4 is a fragmentary perspective view of a portion of the air maintenance tire system component protector shown in FIG. 2.
Figure 5:
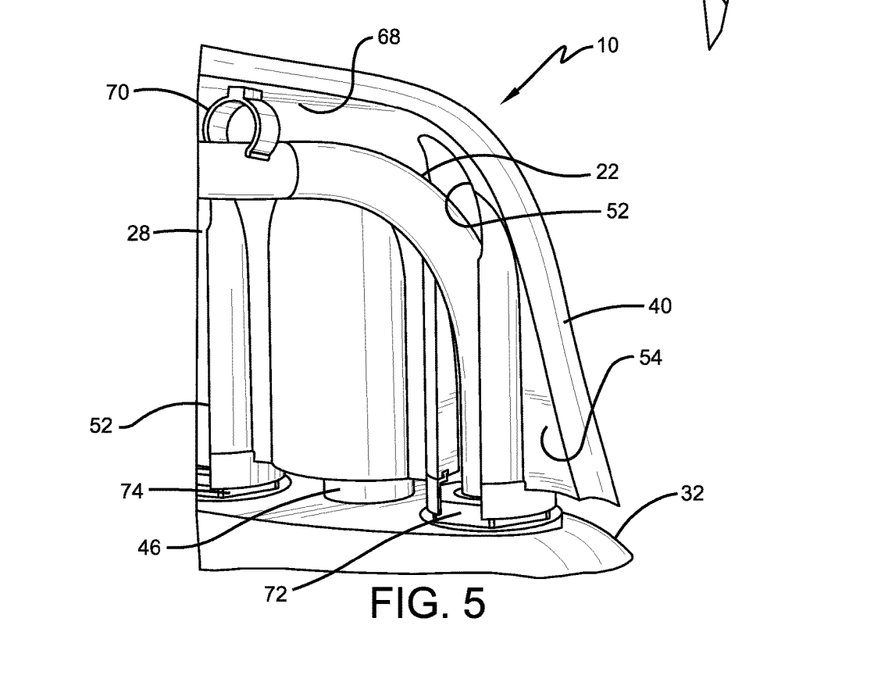
FIG. 5 is a fragmentary perspective view of another portion of the air maintenance tire system component protector shown in FIG. 2.

Turning to FIG. 1, a tire 12 is mounted on a rim 14 in a conventional manner as known to those skilled in the art and defines a cavity (not shown). An exemplary air maintenance tire system, such as a valve stem-based air maintenance tire system, is indicated at 16. The air maintenance tire system 16 includes a peristaltic pump assembly 18. The peristaltic pump assembly 18 includes an annular air tube 20 that is received in an annular groove 38 formed in the tire 12 and/or rim 14, and in turn encloses an annular passageway (not shown).

A first connecting tube 22 attaches to a first end 24 of the annular air tube 20 and fluidly connects the first end of the annular air tube to a valve housing 26 of the pump assembly 18. A second connecting tube 28 attaches to a second end 30 of the annular air tube 20 and fluidly connects the second end of the annular air tube to the valve housing 26.

When the tire 12 rotates under load along a ground surface, the annular air tube 20 is sequentially flattened or squeezed at the tire footprint. The sequential flattening of the annular air tube 20 and its passageway, segment by segment, directs air to the valve housing 26. A tire valve stem (not shown), including a check valve, is fluidly connected to the valve housing 26. When the air pressure is sufficient against the check valve and the air pressure within the tire cavity is below a set pressure level, air passes into the tire cavity. When the air pressure level within the tire cavity is at or above the set pressure, the check valve closes and air from the pump assembly 18 is vented by a relief valve in the valve housing 26 to atmosphere.

As seen in FIG. 1, the valve housing 26 of the pump assembly 18 is disposed within the rim 14. The connecting tubes 22, 28 pass through an opening 36 formed in the rim 14 and extend to a fairly rigid elastomer or polymer mounting member 32, which is referred to as a dome. The dome 32 is secured to a sidewall 34 of the tire 12, and facilitates the fluid connection of the first connecting tube 22 to the first end 24 of the annular air tube 20 via a first fitting 72 and the fluid connection of the second connecting tube 28 to the second end 30 of the annular air tube via a second fitting 74. The first and second connecting tubes 22 and 28 thus are disposed on the outboard surface of the tire 12 and the rim 14, where they are exposed to potentially damaging road debris and environmental conditions.

With reference now to FIGS. 2 through 5, an exemplary embodiment of an air maintenance tire system component protector of the present invention is indicated generally at 10. The protector 10 extends radially from the valve housing 26 to the dome 32 to engage and cover the connecting tubes 22 and 28 to protect them. The connecting tubes 22 and 28 typically are formed of a polymer, such as a flexible plastic, to enable the tubes to flex as the tire 12 undergoes cyclic deflection during rotation. As will be described in greater detail below, the protector 10 thus includes a structure that enables it to flex, while remaining stable to provide secure protection for the tubes 22 and 28.

The protector 10 includes a first end 40, a second end 42 and a mid-portion 44 disposed between the first and second ends. The first end 40 of the protector 10 provides rigid support and a secure connection of the protector to the dome 32. More particularly, the first end 40 is curved axially inboardly relative to the remainder of the protector 10 to provide a stable mounting platform against the dome 32. Preferably, the first end 40 is secured to the dome 32 by a mechanical fastener, such as a screw 46. For example, an opening 48 may be formed in the first end 40 of the protector 10, which aligns with the dome 32 in between the connecting tubes 22 and 28, thereby enabling the screw 46 to be secured to a solid area of the dome without adversely affecting the fluid connection of each respective connecting tube to the annular tube 20.

The first end 40 of the protector 10 also preferably includes a boot 50. The boot 50 is formed of an elastomeric material, and covers the connection of each connecting tube 22 and 28 to the respective fittings 72 and 74 at the dome 32, which reinforces these connections. In addition, the boot 50 optionally contacts and seats on the dome 32 to enable the protector 10 to be supported by the dome. The first end 40 of the protector 10 also includes a pair of slots 52 that are formed in a radially inward surface 54 of the protector first end. Preferably, each of the connecting tubes 22 and 28 snap into a respective one of the slots 52, enabling the first end 40 of the protector 10 to support the connecting tubes adjacent the dome 32. Such support enables the protector 10 to maintain a straight connection of each connecting tube 22 and 28 to the dome 32 to reduce any potential stress in the tubes, reduce abrasion of the tubes with other components such as connecting screws and improve the fatigue behavior of the tubes, all which desirably increase the life of the tubes.

The second end 42 of the protector 10 provides rigid support and a secure connection of the protector to the valve housing 26. More particularly, the valve housing 26 typically includes a nut 56 on its outboard surface that threads onto a bolt 58 of the valve housing. An opening 60 is formed in the second end 42 of the protector 10, which enables the bolt 58 to pass through the protector 10. A lip 62 is formed on the inner circumference of the opening 60, and the nut 56 engages the lip to secure the second end 42 of the protector 10 to the outboard surface of the valve housing 26. The second end 42 of the protector 10 preferably is also formed with a rounded edge 64 that curves axially inboardly to surround the radially inward perimeter edge of the outboard surface of the valve housing 26, thereby providing increased protection of the valve housing.

The protector 10 is formed with a taper extending from the first end 40 to the mid-portion 44, and with a taper extending from the second end 42 to the mid-portion 44. As a result, the mid-portion 44 preferably is thinner than the first end 40 and the second end 42. The mid-portion includes a flexible member 66, such as a bellows. The bellows 66 may be a discrete member formed of a flexible material such as an elastomer, or it may be an integrated flexible feature formed in the mid-portion 44 of the connector 10.

The flexible member 66 enables the protector 10 to flex along three planes of motion. Specifically, if the valve housing 26 has shifted circumferentially relative to the dome 32 and the valve housing and dome are thus misaligned, the flexible member 66 still enables a secure connection of the protector first end 40 to the dome and the second end 42 to the valve housing. If the valve housing 26 has shifted axially inboardly or axially outboardly relative to the dome 32, the flexible member 66 again enables a secure connection of the protector first end 40 to the dome and the second end 42 to the valve housing. Finally, as the tire 12 rotates and experiences cyclic deflection, the radial distance between the dome 32 and the valve housing 26 may change by up to about five (5) or six (6) millimeters. The flexible member 66 readily absorbs and thus accommodates such a change in radial distance, thereby maintaining a secure connection of the protector first end 40 to the dome 32 and the second end 42 to the valve housing 26.

The protector 10 includes one or more pairs of connectors or clips 70 that are attached to an axially inboard surface 68 of the protector. The connectors or clips 70 snap onto and engage the connecting tubes 22 and 28 to retain the tubes adjacent the inboard surface 68 of the protector 10. The connectors 70 thus keep the connecting tubes 22 and 28 in a protected location, and by anchoring them to the protector 10, reduce undesirable vibration of the tubing as the tire 12 rotates.

Preferably, the protector 10 is formed of a light weight, yet stable, material. For example, the protector 10 may be formed of rigid nylon polymer, which provides a weight between about ten (10) and fifteen (15) grams for the protector 10. The protector 10 is easily installed after the air maintenance tire system 16 has been assembled, requiring no special steps or specialized tools. Likewise, the protector 10 is easy to remove and/or replace, if needed. Advantageously, the protector 10 interfaces with existing components of the air maintenance tire system 16, so that no additional components or adaptations are needed to employ the protector.

Figure 6:
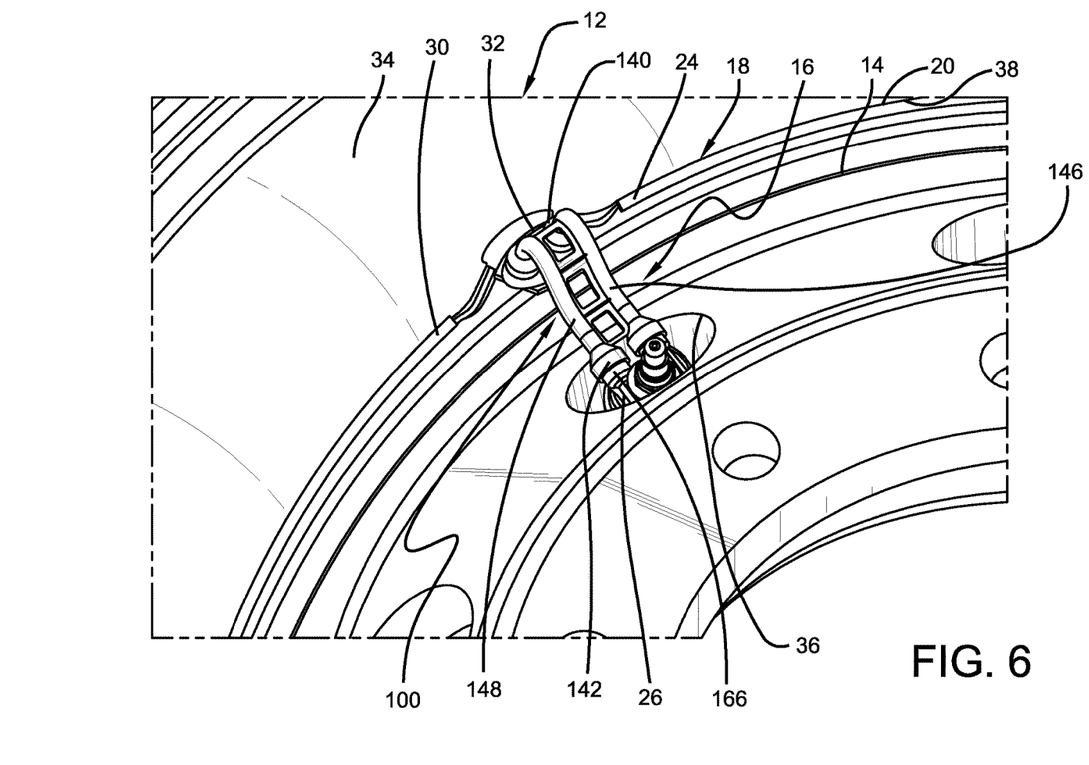
FIG. 6 is a fragmentary perspective view of an outboard side of a tire including components of a valve stem-based air maintenance tire system and another exemplary embodiment of an air maintenance tire system component protector of the present invention.
Figure 7:
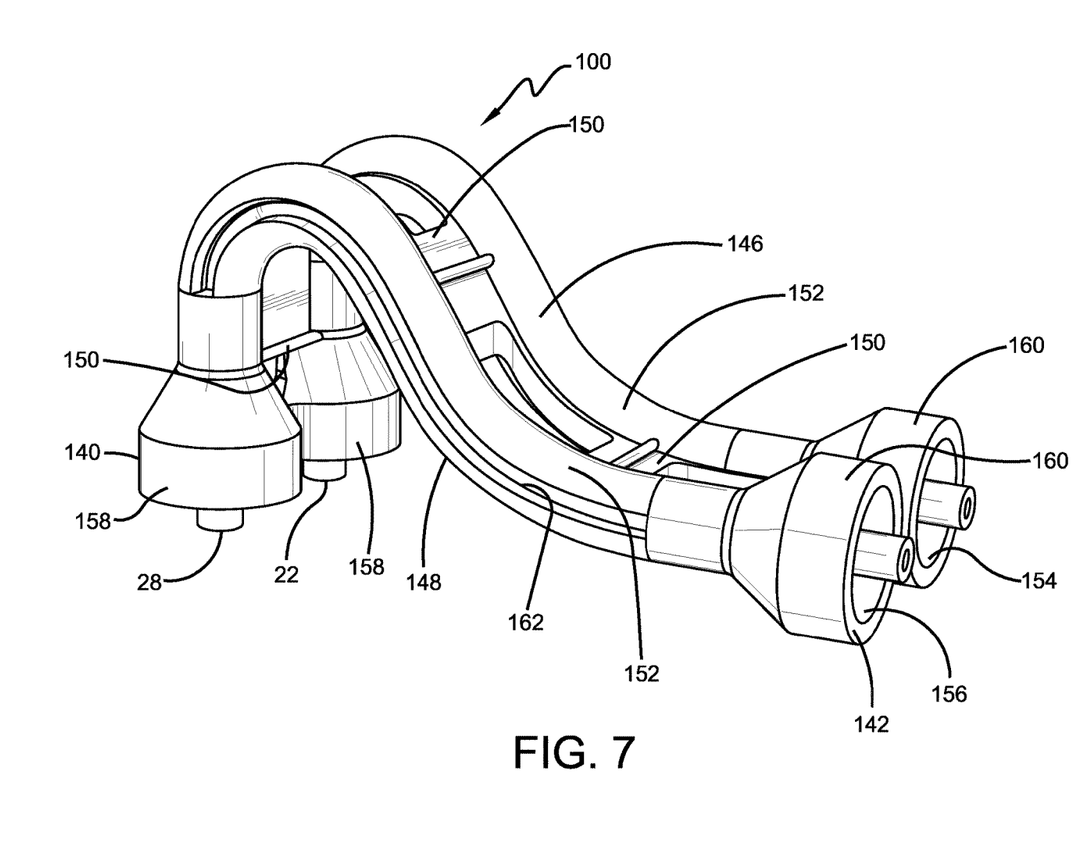
FIG. 7 is a perspective view of the air maintenance tire system component protector and flexible connecting tubes of the air maintenance tire system shown in FIG. 6.

Turning to FIGS. 6 and 7, a second exemplary embodiment of an air maintenance tire system component protector of the present invention is indicated generally at 100. The second embodiment of the protector 100 extends radially from the valve housing 26 to the dome 32 to engage and cover the connecting tubes 22 and 28 to protect them. The connecting tubes 22 and 28 typically are formed of a polymer, such as a flexible plastic, to enable the tubes to flex as the tire 12 undergoes cyclic deflection during rotation. As will be described in greater detail below, the protector 100 thus includes a structure that enables it to flex, while remaining stable to provide secure protection for the tubes 22 and 28.

The second embodiment of the protector 100 includes a first end 140 and a second end 142. The first end 140 connects to the dome 32 and the second end 142 connects to the valve housing 26, as will be described in greater detail below. The second embodiment of the protector 100 also includes a first half 146 that substantially surrounds or encapsulates the first connecting tube 22, and a second half 148 that substantially surrounds or encapsulates the second connecting tube 28. The terms "substantially surrounds" and "encapsulates" mean an extension about the circumference of each respective connecting tube 22 and 28 that is from about 270 degrees to about 360 degrees, and an extension along the length of each connecting tube that is about equal to the length of each respective tube which is exposed between the dome 32 and the valve housing 26 as shown in FIG. 1. The first half 146 and the second half 148 each include a generally solid, semi-rigid body 152, with multiple bridges 150 extending between and connecting the body of the first half to the body of the second half, thereby forming an integral unit.

The first half 146 defines an internal cavity 154 that receives the first connecting tube 22, and the second half 148 defines an internal cavity 156 that receives the second connecting tube 28. The internal cavity 154 enables the first half 146 to substantially surround or encapsulate the first connecting tube 22 and thus protect the tube, while the internal cavity 156 enables the second half 148 to substantially surround or encapsulate the second connecting tube 28 and thus protect the tube.

The first end 140 of the second embodiment of the protector 100 provides rigid support and a secure connection of the protector to the dome 32. More particularly, the first end 140 is curved axially inboardly relative to the remainder of the protector 100, and each of the first and second halves 146 and 148 is formed with a respective dome mounting flange 158. Each dome mounting flange 158 seats and thus docks on a respective one of the fittings 72 and 74 at the dome 32. The flanges 158 thus provide a stable mounting platform against the dome 32. In this manner, the first end 140 of the protector 100 supports the connecting tubes 22 and 28 adjacent the dome 32. Such support enables the protector 100 to maintain a straight connection of each connecting tube 22 and 28 to the dome 32 to reduce any potential stress in the tubes, reduce abrasion of the tubes with other components and improve the fatigue behavior of the tubes, all which desirably increase the life of the tubes.

The second end 142 of the protector 100 provides rigid support and a secure connection of the protector to the valve housing 26. More particularly, the valve housing 26 may be formed with bosses 166 that receive each of the first and second connecting tubes 22 and 28. Each of the first and second halves 146 and 148 of the protector 100 is formed with a respective valve mounting flange 160 that seats and thus docks on a respective one of the valve housing bosses 166. The flanges 160 thus provide a stable mounting platform on the valve 26. In this manner, the second end 142 of the protector 100 supports the connecting tubes 22 and 28 at the valve housing 26. Such support enables the protector 100 to maintain a straight connection of each connecting tube 22 and 28 to the valve housing 26 to reduce any potential stress in the tubes, reduce abrasion of the tubes with other components and improve the fatigue behavior of the tubes, all which desirably increase the life of the tubes.

As mentioned above, the second embodiment of the protector 100 docks onto the dome fittings 72 and 74 and the valve bosses 166 to secure its position. Preferably, the protector 100 extends between the dome fittings 72 and 74 and the valve bosses 166 in an interference fit, which eliminates the need for additional fasteners. Optionally, additional fasteners or adhesives may be employed to secure the position of the protector 100, depending on design considerations. The separate first half 146 and second half 148 of the protector 100 desirably maintains separation of the tubes 22 and 28

In addition, the body 152 of each of the first half 146 and the second half 148 of the second embodiment of the protector 100 is formed with a curved profile that supports the connection of the tubes 22 and 28 at the dome 32 and at the valve housing 26. Such support desirable reduces fatigue cycling amplitude of the tubes 22 and 28. As mentioned above, multiple bridges 150 extend between and connect the body 152 of the first half 146 to the body of the second half 148, which increases the structural stiffness of the protector 100 to maintain the spacing between the respective tubes 22 and 28. The bridges 150 are spaced apart to create openings that desirably reduce the weight of the protector 100 and reduce buildup of dust and/or dirt on the protector.

Moreover, the shape and the configuration of the body 152 enables the protector 100 to flex along three planes of motion. Specifically, if the valve housing 26 has shifted circumferentially relative to the dome 32 and the valve housing and dome are thus misaligned, the shape of the body 152 still enables a secure connection of the protector first end 140 to the dome and the second end 142 to the valve housing. If the valve housing 26 has shifted axially inboardly or axially outboardly relative to the dome 32, the shape of the body 152 again enables a secure connection of the protector first end 140 to the dome and the second end 142 to the valve housing. Finally, as the tire 12 rotates and experiences cyclic deflection, the radial distance between the dome 32 and the valve housing 26 may change by up to about five (5) or six (6) millimeters. The shape and configuration of the body 152 readily absorbs and thus accommodates such a change in radial distance, thereby maintaining a secure connection of the protector first end 140 to the dome 32 and the second end 142 to the valve housing 26.

Preferably, the second embodiment of the protector 100 is formed as a single component from a light weight, yet stable, material. For example, the protector 100 may be formed of rubber or a co-polyester elastomer, which provides a weight between about five (5) and six (6) grams for the protector 100. Such a construction also enables the protector 100 to be semi-rigid, so that it may flex with the cyclic deflection of the tire 12, while providing a secure structure that protects the tubes 22 and 28.

The second embodiment of the protector 100 is easily installed, requiring no special steps or specialized tools. For example, the tubes 22 and 28 may be connected to the valve housing 26. The first connecting tube 22 may then be fed into the inner cavity 154 in the first half 146 of the protector 100, and the second connecting tube 28 may be fed into the inner cavity 156 of the second half 148 of the protector. The tubes 22 and 28 are connected to the dome 32 at respective fittings 72 and 74. The valve mounting flanges 160 of the protector 100 are secured to the valve housing bosses 166 and the dome mounting flanges 158 are secured to the dome fittings 72 and 74. Of course, this sequence may be altered or adjusted as desired.

To enable ease of installation of the protector 100 over the tubes 22 and 28, each of the first half 146 and the second half 148 is formed with a slot 162 (only one shown). The slots 162 extend for a substantial portion along the length of the body 152 of each of the first and second halves 146 and 148, thereby enhancing the flexibility of the protector 100 for the installation of the tubes 22 and 28 into the protector.

With this structure, the second embodiment of the protector 100 is easy to remove and/or replace, if needed. Advantageously, the protector 100 interfaces with existing components of the air maintenance tire system 16, so that no additional components or adaptations are needed to employ the protector.

The air maintenance tire system component protector 10, 100 of the present invention thus provides protection of the connecting tubes 22 and 28 and the valve housing 26 from debris impacts. In addition, the protector 10, 100 retains the position of the connecting tubes 22 and 28 so that the tubes do not touch other components of the vehicle. By anchoring the connecting tubes 22 and 28 to a streamlined structure that also covers the outboard surface of the valve housing 26, the protector 10, 100 also improves the aesthetic appearance of the connecting tubes and the valve housing.

By covering the connecting tubes 22 and 28, the protector 10, 100 desirably provides protection of the tubes, which may be formed from a polymer, from potentially degrading ultraviolet light. By being light, yet stable, the protector 10, 100 supports the connection of the flexible connecting tubes 22 and 28 to the dome 32, improving the ability of the connecting tubes to withstand the stress created by the cyclic deflection of the tire 12 during rotation. The protector 10, 100 also provides a stable anchor for the connecting tubes 22 and 28 to reduce the vibration of the tubes as the tire 12 rotates. Moreover, by supporting the connecting tubes 22 and 28, the protector 10, 100 desirably increases the life of the connecting tubes, as it reduces potential stress in the tubes, improves the fatigue performance of the tubes and reduces abrasion on the tubes at or near their respective connections to the dome 32 and the valve housing 26.

The present invention also includes a method of protecting components of an air maintenance tire system. The method includes steps in accordance with the description that is presented above and shown in FIGS. 2 through 7.

It is to be understood that the structure of the above-described air maintenance tire system component protector may be altered or rearranged, or components known to those skilled in the art omitted or added, without affecting the overall concept or operation of the invention. For example, the protector 10, 100 may be of a one-piece or a multi-piece construction, and/or may be formed of one material or multiple materials. As an additional example, the flexible member 66 of the first embodiment of the protector 10 may be formed of a different material than the rest of the protector, or from the same material as the rest of the protector.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A protector for components of an air maintenance tire system, the components of the air maintenance tire system including an annular air tube being mounted to a tire, a mounting member being secured to a sidewall of the tire and connected to the annular air tube, and at least one flexible connecting tube extending between the mounting member and a valve housing to enable fluid communication between the annular air tube and the valve housing, the protector comprising:

a first end disposed proximate a connection of the at least one connecting tube to the mounting member and being secured to the mounting member;

a second end disposed proximate the valve housing and being secured to the valve housing, whereby the protector covers at least an outboard surface of the at least one connecting tube for a length of the connecting tube extending between the mounting member and the valve housing; and a mid-portion disposed between the first end and the second end, the protector being formed with a taper extending from the first end to the mid-portion, and with a taper extending from the second end to the mid-portion.

2. The protector of claim 1, wherein the first end of the protector is curved axially inboardly.

3. The protector of claim 2, wherein the first end of the protector is secured to the mounting member by a mechanical fastener.

4. The protector of claim 2, wherein the first end of the protector includes an elastomeric material that engages the mounting member.

5. The protector of claim 2, wherein the first end of the protector includes a mounting flange that seats on a respective fitting at the mounting member.

6. The protector of claim 1, wherein an opening is formed in the second end of the protector for receiving a bolt of the valve housing, a lip is formed on an inner circumference of the opening, and a nut engages the lip.

7. The protector of claim 1, wherein the second end of the protector includes a valve mounting flange that seats on a boss formed on the valve housing.

8. The protector of claim 1, wherein the mid-portion includes a flexible member.

9. The protector of claim 8, wherein the flexible member is a discrete elastomeric member.

10. The protector of claim 8, wherein the flexible member is an integrated flexible feature.

11. The protector of claim 1, further comprising at least one slot formed in a radially inward surface of the first end of the protector to engage the at least one connecting tube.

12. The protector of claim 1, further comprising at least one connector attached to an inboard surface of the protector to engage the at least one connecting tube.

13. A protector for components of an air maintenance tire system, the components of the air maintenance tire system including an annular air tube being mounted to a tire, a mounting member being secured to a sidewall of the tire and connected to the annular air tube, and a pair of flexible connecting tubes, a first one of the pair of the connecting tubes extending between the mounting member and a valve housing and being in fluid communication with a first end of the annular air tube and the valve housing, and a second one of the pair of the connecting tubes extending between the mounting member and a valve housing and being in fluid communication with a second end of the annular air tube and the valve housing, the protector comprising:

a first end disposed proximate a connection of each one of the pair of the connecting tubes to the mounting member and being secured to the mounting member; and     a second end disposed proximate the valve housing and being secured to the valve housing, whereby the protector covers at least an outboard surface of each one of the pair of the connecting tubes for a respective length of each connecting tube extending between the mounting member and the valve housing.

14. The protector of claim 13, wherein the protector includes a first half that defines an internal cavity that receives the first one of the pair of the connecting tubes, and the protector includes a second half that defines an internal cavity that receives the second one of the pair of the connecting tubes.

15. The protector of claim 14, further comprising a plurality of bridges that connect the first half and the second half, whereby the protector forms an integral unit.

16. The protector of claim 13, wherein the first end of the protector is formed with a mounting flange, and the mounting flange seats on a respective fitting at the mounting member to secure the first end of the protector to the mounting member.

17. The protector of claim 13, wherein the second end of the protector is formed with a mounting flange, and the mounting flange seats on a respective valve housing boss to secure the second end of the protector to the valve housing.

18. A protector for components of an air maintenance tire system, the components of the air maintenance tire system including an annular air tube being mounted to a tire, a mounting member being secured to a sidewall of the tire and connected to the annular air tube, and at least one flexible connecting tube extending between the mounting member and a valve housing to enable fluid communication between the annular air tube and the valve housing, the protector comprising:

a first end disposed proximate a connection of the at least one connecting tube to the mounting member and being secured to the mounting member; and     a second end disposed proximate the valve housing and being secured to the valve housing, whereby the protector covers at least an outboard surface of the at least one connecting tube for a length of the connecting tube extending between the mounting member and the valve housing, and wherein the protector surrounds from about two hundred and seventy degrees to about three hundred and sixty degrees of a circumference of the at least one connecting tube.

19. The protector of claim 18, wherein the first end of the protector is formed with a mounting flange, and the mounting flange seats on a respective fitting at the mounting member to secure the first end of the protector to the mounting member.

20. The protector of claim 18, wherein the second end of the protector is formed with a mounting flange, and the mounting flange seats on a respective valve housing boss to secure the second end of the protector to the valve housing.

\* \* \* \* \*